United States Patent [19]

Tamamori

[11] 4,375,303
[45] Mar. 1, 1983

[54] CHANGE-OVER VALVE DEVICE UTILIZING THE LOWER PRESSURE OF A DOUBLE INPUT PRESSURE SYSTEM FOR INCREASING THE DEGREE OF DELIVERED OPERATING PRESSURE

[75] Inventor: Hideo Tamamori, Kobe, Japan

[73] Assignee: Nippon Air Brake Co., Ltd., Kobe, Japan

[21] Appl. No.: 215,475

[22] Filed: Dec. 11, 1980

[30] Foreign Application Priority Data

Dec. 11, 1979 [JP] Japan ................... 54-161295

[51] Int. Cl.³ ........................... B60T 15/02
[52] U.S. Cl. ................... 303/40; 137/112; 303/13; 303/66
[58] Field of Search ................... 303/2–4, 303/15, 13, 14, 40, 29, 30, 28, 86, 22, 23, 18, 66, 93, 94, 100, 101, 48, 50; 137/112, 116.5

[56] References Cited

U.S. PATENT DOCUMENTS

| | | | |
|---|---|---|---|
| 3,272,564 | 9/1966 | Romanini | 303/13 X |
| 3,667,815 | 6/1972 | Zoppi | 303/13 X |
| 3,944,287 | 3/1976 | Nagase | 303/40 X |
| 3,996,955 | 12/1976 | Kawabata | 137/116.5 |
| 4,239,292 | 12/1980 | Nagase | 303/3 |
| 4,302,058 | 11/1981 | Nagase et al. | 303/40 X |

Primary Examiner—Douglas C. Butler
Attorney, Agent, or Firm—R. S. Visk

[57] ABSTRACT

A change-over valve device having a pair of oppositely disposed control pressure chambers subject to respective control pressures from two independent pressure input systems and operable for diverting the lower control pressure to a delivery chamber so as to increase the degree of the pressure normally delivered from the delivery chamber by an amount corresponding to the degree of such lower control pressure.

4 Claims, 2 Drawing Figures

CHANGE-OVER VALVE DEVICE UTILIZING THE LOWER PRESSURE OF A DOUBLE INPUT PRESSURE SYSTEM FOR INCREASING THE DEGREE OF DELIVERED OPERATING PRESSURE

BACKGROUND OF THE INVENTION

In some instances a greater degree of braking action is required by railway vehicles, such as in the use of snowplows which must be moved at high rates of speed and, therefore, require a higher degree of braking in retarding or stopping the equipment. If an Automatic Train Operating Device (A.T.O.) is in use, it may be coordinated with manual brake operation to provide a higher degree of braking for railway cars by using a change-over valve device in a double input control pressure system.

SUMMARY OF THE INVENTION

The invention resides in a change-over valve device which utilizes the lower pressure of a double input pressure system for effecting braking operation, and is characterized by the feature that a delivery pressure chamber may be communicated with a supply pressure chamber by unseating a supply valve from a valve seat provided in a partition between the supply pressure chamber and the delivery pressure chamber, when one input pressure provided in a first control pressure chamber is higher than that provided in a second control pressure chamber. In a situation where the pressure of a single input pressure system is introduced into both the second control pressure chamber, for example, on the supply valve side of a valve-operating piston and into the supply pressure chamber, while pressure from a different input pressure system is introduced into the first control pressure chamber on the other side of the piston, if the pressure in the first control chamber is less than that in the second control chamber, the piston moves downwardly and thereby causes a tubular piston stem attached thereto, with a valve seat formed on the end thereof, to be unseated from the supply valve so that the first control chamber is communicated with the delivery chamber by way of said tubular valve stem and said unseated valve, so that the pressure in the first control chamber is utilized to increase the degree of pressure delivered from the delivery pressure chamber to provide a higher degree of brake application.

Figure 1:
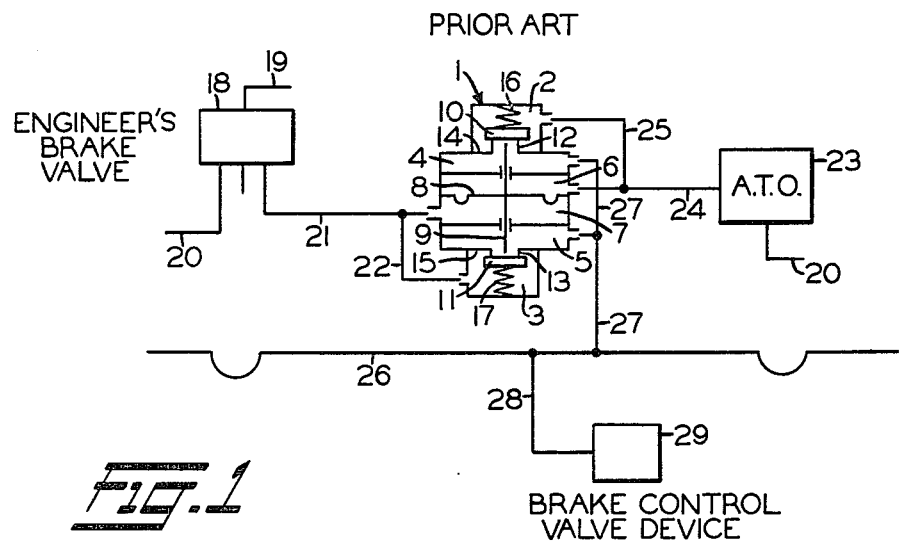
FIG. 1 is a schematic view of a fluid pressure operable brake system marked PRIOR ART and showing a known type changeover valve device.

A double input control pressure system shown in FIG. 1 and labeled PRIOR ART uses a presently known change-over valve device designated generally by the reference numeral 1. The change-over valve device 1 has formed at opposite ends thereof a first supply pressure chamber 2 and a second supply pressure chamber 3, and adjacent thereto a first delivery pressure chamber 4 and a second delivery pressure chamber 5, respectively. Also formed adjacent delivery pressure chambers 4 and 5 are a first control pressure chamber 6 and a second control pressure chamber 7, respectively, with an operating piston 8, such as a diaphragm type piston, for example, operably disposed therebetween and separating the control chambers.

Piston 8 has a piston stem 9 secured thereto and movable therewith. The opposite ends of stem 9 are engageable with a first supply valve 10 and a second supply valve 11 disposed in supply pressure chambers 2 and 3, respectively. Supply valves 10 and 11 cooperate with a first valve seat 12 and a second valve seat 13 formed in partitions 14 and 15 for controlling communication between chambers 2 and 4 and between chambers 3 and 5, respectively. Valves 10 and 11 are biased by springs 16 and 17 toward seated positions on valve seats 12 and 13, respectively.

The prior art system shown in FIG. 1 also includes an engineer's brake valve 18 manually operable by a handle 19, said brake valve being connected via a main reservoir pipe 20 to a source of fluid under pressure such as a main reservoir (not shown). Pipe 20 may, therefore, be considered the source of fluid under pressure for the apparatus. Brake valve 18 is also connected via a first control pipe 21 and a first branch supply pipe 22 to control chamber 7 and supply chamber 3, respectively.

An Automatic Train Operating Device (A.T.O.) 23 is connected via a second control pipe 24 and a second branch supply pipe 25 to control chamber 6 and supply chamber 2, respectively. A.T.O. 23 also includes a pick-up device (not shown) normally disposed at a strategic point along the right of way for one reason or another such as emitting a train propulsion control signal or a train brake control signal. For example, the pick-up device may be located on the approach side of a dangerous curve. If the train, on approaching the curve, is traveling at a speed too great for negotiating the curve safely, the pick-up device transmits a signal picked up by device 23, which is also connected to pipe 20. Device 23 operates to transmit a control pressure to control chamber 6 for effecting a braking action in a manner to be hereinafter explained. Delivery chambers 4 and 5 are connected to a brake pipe 26 via a common delivery pipe 27, said brake pipe being connected by a pipe 28 to a brake control valve 29.

Let it be assumed that the operator initiates a brake application with the brake valve 18 and, at the same time, A.T.O. 23 also automatically initiates a brake application in response to an undesirable situation along the right-of-way. Both control chambers 6 and 7, and both supply chambers 2 and 3 are charged with respective pressures at degrees commensurate with the degrees initiated by the operator and the A.T.O., respectively. If one or the other of the pressures established in control chambers 6 and 7, say that in control chamber 6, is higher than that established in control chamber 7, piston 8 is moved downwardly by stem 9 to cause supply valve 10 to be seated on valve seat 12 by spring 16 while said valve stem moves supply valve 11 to an unseated position from valve seat 13. With supply valve 10 in a seated position on valve seat 12, supply pressure is cut off from delivery chamber 4, and with supply valve 11 unseated from valve seat 13, supply pressure from supply chamber 3 is transmitted to brake pipe 26 via open valve 11, delivery chamber 5, and pipe 27, thence, via pipe 28 to brake control valve device 29. In response to actuating pressure transmitted to control valve 29 from brake pipe 26, said control valve operates to effect a brake application according to the degree of said actuating pressure as initiated by brake valve device 18.

It should be understood that if the pressure established in control chamber 7 is greater than that in control chamber 6, when both brake valve 18 and A.T.O. 23 operate to initiate a brake application, change-over valve device 1 operates reversely to the manner immediately above described to cause pressure signal from supply chamber 2, delivery chamber 4, via pipe 27 to be transmitted to brake pipe 26, and via pipe 28 to brake control valve device 29 to effect a brake application according to the relative pressures established in control chambers 6 and 7.

Figure 2:
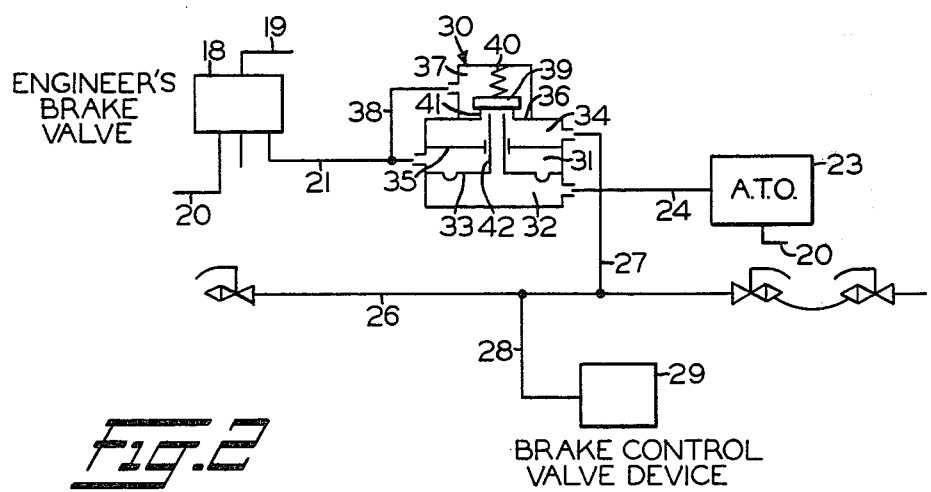
FIG. 2 is a schematic view of a fluid pressure operable brake system including a novel change-over valve device shown in diagrammatic form.

According to the invention, a simplified change-over valve device 30, as shown in FIG. 2, may be substituted for the change-over valve device 1 shown in FIG. 1. Components similar in structure as those shown in FIG. 1 have been designated with similar reference numerals.

Change-over valve device 30 comprises a casing also having formed therein a first control pressure chamber 31 and a second control pressure chamber 32, as viewed in FIG. 2, disposed on opposite sides of an operating piston 33 and connected via pipes 21 and 24 to engineer's brake valve 18 and A.T.O. 23, respectively.

Change-over valve device 30 is also provided with a delivery pressure chamber 34 separated by a partition 35 from control pressure chamber 31 and by a partition 36 from a supply pressure chamber 37. Supply pressure chamber 37 is connected to pipe 21 via a branch pipe 38, while delivery chamber 34 is connected to brake pipe 26 via pipe 27. A supply valve member 39, biased by a spring 40 disposed in chamber 37 toward a seated position on a valve seat 41 formed in partition 36, controls communication between said supply chamber and delivery chamber 34. A tubular valve stem 42 having one end secured to piston 33, extends axially toward supply valve 39 with sealing sliding action through a central opening formed in partition 35 and with the free end of said stem terminating just short of said supply valve in a neutral position of the piston, as shown in FIG. 2.

Let it be assumed that the operator initiates a brake application from brake valve 18 and, at the same time A.T.O. 23 also automatically initiates a brake application due to an unfavorable situation existing along the right-of-way. Both control chambers 31 and 32 are charged with respective pressures at degrees commensurate with the degrees initiated by the operator and the A.T.O. 23. If the pressure in one or the other of control chambers 31 and 32, as for example that in chamber 32, is greater than that in the other control chamber, piston 33, due to the differential pressure thereacross, moves upwardly. The free end of piston stem 42 seats against supply valve 39 to close off communication, via said tubular valve stem, between control chamber 32 and delivery chamber 34. Supply valve 39 is operated by stem 42 to an unseated position off valve seat 41 to thereby connect supply chamber 37 to control valve 29 via unseated valve 39, valve seat 41, delivery chamber 34, pipe 27, brake pipe 26, and pipe 28 to thereby effect a brake application according to the degree of pressure supplied by brake valve 18 to said supply chamber.

It should be understood that if the pressure established in control chamber 31 is greater than that in control chamber 32, the change-over valve device operates reversely to the manner immediately above discussed, that is, piston 33 is moved downwardly by the higher pressure in control chamber 31 to cause hollow piston stem 42 to be unseated from supply valve 39 and allow spring 40 to seat said supply valve on valve seat 41. With valve 39 seated on valve seat 41, communication between supply chamber 37 and delivery chamber 34 is cut off, whereas communication is established between A.T.O. 23 and control valve 29 via control chamber 32, hollow stem 42, past the unseated end of said hollow stem, via delivery chamber 34, pipe 27, brake pipe 26, and pipe 28 to effect a brake application according to the relative pressures established in control chambers 31 and 32.

Having now described the invention, what I claim as new and desired to secure by Letters Patent, is:

1. A change-over valve device for use in a fluid pressure operable brake system including an engineer's brake valve device manually operable for initiating a first control pressure output, an automatic train operator operable responsively to certain dangerous conditions along the right-of-way for automatically initiating a second control pressure output, a brake pipe subjectable to said control pressure outputs, and a brake control valve device connected to said brake pipe, wherein the improvement comprises said change-over valve device comprising:

(a) a casing having a pair of control pressure chambers therein separated by a reciprocable piston member and connected to said engineer's brake valve device and said automatic train operator, respectively, (b) said casing also having formed therein a delivery chamber isolated from said control chambers by a first partition formed in said casing, said delivery chamber being connected to said brake pipe;

(c) a supply valve member operably interposed between said delivery chamber and a supply pressure chamber formed in said casing and also connected to the engineer's brake valve device, said supply valve member normally being biased to a seated position on a valve seat formed in a second partition formed in said casing between said delivery chamber and said supply pressure chamber; and (d) a tubular piston stem extending axially from said reciprocable piston member through a central opening, with sealing sliding contact therewith, formed in said first partition, with a free open end of said tubular piston stem terminating adjacent said valve member, (e) said reciprocable piston member being axially movable, in response to a pressure differential thereacross when the pressure in one of said control chambers is greater than that in the other, in one direction in which said supply valve member is engaged by said tubular piston stem and operated to an unseated position relative to said valve seat for communicating said supply chamber with said delivery chamber, and (f) said reciprocable piston member being axially movable, in response to a pressure differential thereacross when the pressure in the other of said control chambers is greater than that in said one control chamber, in an opposite direction in which said supply valve member is disengaged by said tubular piston stem and biased to a seated position on said valve seat, said one control chamber being communicated with said delivery chamber via said tubular piston stem.

2. A change-over valve device for use in a fluid pressure operable brake system, as set forth in claim 1, further characterized by spring means disposed in said supply pressure chamber for biasing said supply valve member toward its said seated position.

3. A change-over valve device for use in a fluid pressure operable brake system, as set forth in claim 1 wherein said other of said control chambers is connected to said engineer's brake valve via a first control pipe and said supply chamber is also connected to said engineer's brake valve via a branch pipe connected to said first control pipe.

4. A change-over valve device for use in a fluid pressure operable brake system, as set forth in claim 1, in which communication between said one control chamber and said delivery chamber is cut off during such time that said free end of said tubular piston stem is seated on said valve member.

* * * * *